(12) United States Patent
Riahi Manesh et al.

(10) Patent No.: US 12,149,560 B2
(45) Date of Patent: Nov. 19, 2024

(54) DETECTION OF CYBER ATTACKS TARGETING AVIONICS SYSTEMS

(71) Applicant: University of North Dakota, Grand Forks, ND (US)

(72) Inventors: Mohsen Riahi Manesh, Grand Forks, ND (US); Naima Kaabouch, Grand Forks, ND (US)

(73) Assignee: University of North Dakota, Grand Forks, ND (US)

( * ) Notice: Subject to any disclaimer, the term of this patent is extended or adjusted under 35 U.S.C. 154(b) by 522 days.

(21) Appl. No.: 17/425,395

(22) PCT Filed: Jan. 22, 2020

(86) PCT No.: PCT/US2020/014663
§ 371 (c)(1),
(2) Date: Jul. 23, 2021

(87) PCT Pub. No.: WO2020/209918
PCT Pub. Date: Oct. 15, 2020

(65) Prior Publication Data
US 2022/0094710 A1    Mar. 24, 2022

Related U.S. Application Data (60) Provisional application No. 62/795,802, filed on Jan. 23, 2019.

(51) Int. Cl.
*H04L 9/00* (2022.01)
*G06F 18/214* (2023.01)
(Continued)

(52) U.S. Cl.
CPC ........ *H04L 63/1458* (2013.01); *G06F 18/214* (2023.01); *G06F 21/554* (2013.01);
(Continued)

(58) Field of Classification Search
CPC ............. H04L 63/1458; H04L 63/1416; H04L 63/1425; H04L 63/20; G06F 18/214;
(Continued)

(56) References Cited

U.S. PATENT DOCUMENTS 9,476,962 B2    10/2016    Murphy et al.
9,544,047 B2    1/2017    Sampigethaya
(Continued)

FOREIGN PATENT DOCUMENTS

WO    WO-2020209918 A2    10/2020
WO    WO-2020209918 A3    11/2020

OTHER PUBLICATIONS

Manesh, et al., "Analysis of vulnerabilities, attacks, countermeasures and overall risk of the Automatic Dependent Surveillance-Broadcast (ADS-B) system", International Journal of Critical Infrastructure Protection, vol. 19, 2017, pp. 16-31 (Year: 2017).*
(Continued)

*Primary Examiner* — Daniel B Potratz
*Assistant Examiner* — Syed M Ahsan
(74) *Attorney, Agent, or Firm* — Schwegman Lundberg & Woessner, P.A.

(57) ABSTRACT

The present subject matter provides various technical solutions to technical problems facing ADS-B cyber-attacks. One technical solution for detecting and mitigating ADS-B cyber-attacks includes receiving extracting information from received ADS-B signals, detecting a cyber-attack based on a selected subset of ADS-B information, determining a detection probability, and outputting a ADS-B cyber-attack type and probability. This solution may further include determining and implementing a cyber-attack mitigation to reduce the probability or effect of the detected cyber-attack. These solutions operate based on current ADS-B receiver technology, and can be combined with
(Continued)

existing ADS-B receivers to detect message injection attacks, modification attacks, and jamming attacks. The technical solutions described herein use machine learning (ML) algorithms and statistical models to detect anomalies in incoming ADS-B messages. This enables these solutions to be trained in different environments, which further improves the cyber-attack detection accuracy and reduces likelihood of false alarms or miss detections.

18 Claims, 5 Drawing Sheets

(51) Int. Cl.
*G06F 21/55* (2013.01)
*G06N 7/01* (2023.01)
*G06N 20/00* (2019.01)
*G06N 20/20* (2019.01)
*H04L 9/40* (2022.01)

(52) U.S. Cl.
CPC ............ *G06N 7/01* (2023.01); *G06N 20/00* (2019.01); *G06N 20/20* (2019.01); *H04L 63/1416* (2013.01); *H04L 63/1425* (2013.01); *H04L 63/20* (2013.01)

(58) Field of Classification Search
CPC ........ G06F 21/554; G06N 7/01; G06N 20/00; G06N 20/20; H04B 7/18506
See application file for complete search history.

(56) References Cited

U.S. PATENT DOCUMENTS

| | | |
|---|---|---|
| 2008/0266166 A1 | 10/2008 | Schuchman |
| 2009/0146875 A1 | 6/2009 | Hovey |
| 2011/0057830 A1 | 3/2011 | Sampigethaya et al. |
| 2012/0041620 A1* | 2/2012 | Stayton ............... G08G 5/0008 701/3 |
| 2013/0083960 A1* | 4/2013 | Kostrzewski ........ H05K 7/1427 361/679.01 |
| 2014/0327581 A1 | 11/2014 | Murphy et al. |
| 2017/0236425 A1 | 8/2017 | Ballestros et al. |
| 2017/0358214 A1 | 12/2017 | Scarlatti et al. |
| 2019/0042748 A1* | 2/2019 | Shabtai ................. G06N 20/00 |

OTHER PUBLICATIONS

Manesh, Mohsen Riahi, and Naima Kaabouch. "Analysis of vulnerabilities, attacks, countermeasures and overall risk of the Automatic Dependent Surveillance-Broadcast (ADS-B) system." International journal of critical infrastructure protection 19 (2017):16-31. (Year: 2017).*

"International Application Serial No. PCT/US2020/014663, International Search Report mailed Oct. 7, 2020", 2 pgs.

"International Application Serial No. PCT/US2020/014663, Written Opinion mailed Oct. 7, 2020", 5 pgs.

"International Application Serial No. PCT US2020 014663, International Preliminary Report on Patentability mailed Aug. 5, 2021", 7 pgs.

* cited by examiner

DETECTION OF CYBER ATTACKS TARGETING AVIONICS SYSTEMS

CLAIM OF PRIORITY

This application is a U.S. National Stage Filing under 35 U.S.C. 371 from International Application No. PCT/US2020/014663, filed on Jan. 22, 2020, and published as WO 2020/2019918 on Oct. 15, 2020, which application claims the benefit of U.S. Provisional Patent Application Ser. No. 62/795,802, filed on Jan. 23, 2019, the benefit of priority of which is claimed hereby, and which is incorporated by reference herein in its entirety.

GOVERNMENT SUPPORT CLAUSE

This invention was made with government support under National Science Foundation Grant No. OIA-1355466 awarded by North Dakota Established Program to Stimulate Competitive Research (ND EPSCoR). The government has certain rights in the invention.

TECHNICAL FIELD

Embodiments described herein generally relate to automatic dependent surveillance-broadcast (ADS-B) systems.

BACKGROUND

With the introduction of ADS-B systems for more precise air traffic control, the aviation community has been migrating from legacy approaches such as radars to ADS-B technology. The ADS-B systems use Global Navigation Satellite Systems (GLASS) such as the Global Positioning System (GPS) to gather and broadcast flight information, such as aircraft identity, heading, three-dimensional position, velocity, and other flight information. The information is broadcast in the form of unencrypted plaintext messages, allowing other aircraft and ground stations to receive and process the information for air traffic awareness and control purposes. While unencrypted plaintext messages simplify transmission and interpretation of ADS-B communication, the use of unencrypted plaintext messages also makes the ADS-B communication vulnerable to several types of cyber-attacks, such as jamming, message injection, modification, and other cyber-attacks. The potential effects of such cyber-attacks may range from a simple distraction of ground controllers to catastrophic aircraft crashes and casualties. What is needed is an improved solution for addressing ADS-B cyber-attacks.

DESCRIPTION OF EMBODIMENTS

The present subject matter provides various technical solutions to technical problems facing ADS-B cyber-attacks. One technical solution for detecting and mitigating ADS-B cyber-attacks includes receiving extracting information from received ADS-B signals, detecting a cyber-attack based on a selected subset of ADS-B information, determining a detection probability, and outputting a ADS-B cyber-attack type and probability. This solution may further include determining and implementing a cyber-attack mitigation to reduce the probability or effect of the detected cyber-attack.

The technical solutions described herein provide various advantages. These solutions operate based on current ADS-B receiver technology, and can be combined with existing ADS-B receivers to detect message injection attacks, message modification attacks, and jamming attacks. These solutions do not require implementing additional array antennas or an encrypted or any other new communication protocol. This enables these technical solutions to be implemented with a lower cost, size, and complexity than solutions that require additional array antennas or communication protocols. These solutions also do not require generating and broadcasting false ADS-B data, which may confuse other ADS-B systems or saturate radio frequency (RF) bands dedicated to ADS-B messages.

The technical solutions described herein use machine learning (ML) algorithms and statistical models to detect anomalies in incoming ADS-B messages. This enables these solutions to be trained in different environments, which enables these solutions to perform reliability in various environments, such as by adapting to environment-specific RF problems caused by interference, multipath, and fading. This ability to be trained in different environments further improves the cyber-attack detection accuracy and reduces likelihood of false alarms or miss detections.

The following description and the drawings sufficiently illustrate specific embodiments to enable those skilled in the art to understand the specific embodiment. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
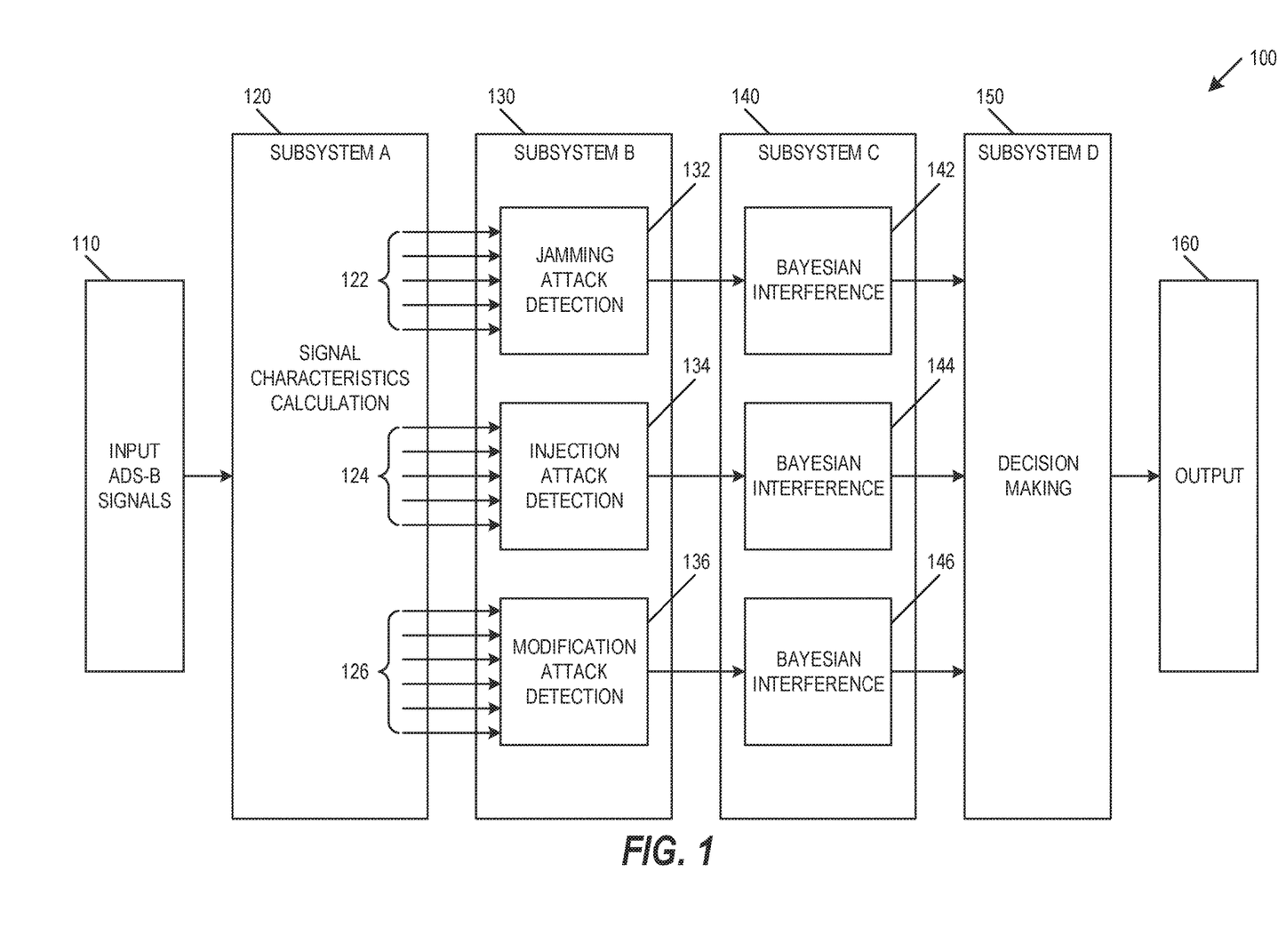
FIG. 1 is a diagram of an ADS-B cyber-attack detection and mitigation system, in accordance with at least one embodiment.

FIG. 1 is a diagram of an ADS-B cyber-attack detection and mitigation system 100, in accordance with at least one embodiment. As shown in FIG. 1, system 100 includes multiple Subsystems. Subsystem A 120 may implement signal characteristics calculations. In operation, Subsystem A receives input ADS-B signals 110 and extract and calculate various parameters from the received ADS-B signals. In an embodiment, these parameters may be classified into two broad categories as (1) information taken from the content of the message (e.g., transmitter latitude, longitude, heading, velocity), and (2) information extracted from the ADS-B physical signal itself (e.g., received signal strength (RSS), frequency of the received signal).

System 100 may focus on specific parameters that provide an improved ability to identify ADS-B attacks by distinguishing between legitimate ADS-B signal and other signals. A list of these parameters that provide an improved ability to detect ADS-B attacks are listed in Table 1:

TABLE 1

ADS-B Attack Detection Signal Parameters

| Characteristic | Notation |
|---|---|
| Ownship latitude | $Lat_R$ |
| Ownship longitude | $Lon_R$ |
| Transmitter latitude | $Lat_T$ |
| Transmitter longitude | $Lon_T$ |
| Velocity difference | $\Delta v$ |
| Received signal strength | RSS |
| Doppler shift | $\Delta f$ |
| Signal-to-noise ratio | SNR |
| Bad Packet Ratio | BPR |
| Mean Eigenvalue | EGV |
| Energy test statistic | E |
| Rate of climb | $c_r$ |
| Rate of turn | $t_r$ |
| Displacement rate | $d_r$ |
| Speed rate | $v_r$ |

Received signal strength (RSS): This parameter has a correlation with the great circle distance, which is calculated from the coordinates of the ownship and the transmitter. RSS is given by the Friis transmission equation as follows:

$$RSS = P_R = \frac{P_T G_T G_R \lambda^2}{(4\pi d)^2} \quad (1)$$

where $P_R$ is the received power at the ownship, $P_T$ is the transmission power, $\lambda$ is the wavelength, $G_T$ and $G_R$ are the transmitter and receiver antenna gains, respectively, and d is the great circle distance between the transmitter and the ownship. These are given by:

$$\alpha = \sin^2\left(\frac{Lat_T - Lat_R}{2}\right) + \cos(Lat_R) \cdot \cos(Lat_T) \cdot \sin^2\left(\frac{Lon_T - Lon_R}{2}\right) \quad (2)$$

$$d = 2 \cdot r \cdot a\tan 2(\sqrt{\alpha}, \sqrt{1-\alpha}) \quad (3)$$

where r is the mean earth radius and atan 2(·) is the Four-quadrant inverse tangent function.

Velocity difference, $\Delta v$: This parameter is a difference between the velocity obtained from the received ADS-B message, $v_T$, and the velocity of the ownship, $v_R$. It is given by:

$$\Delta v = v_R - v_T.$$

Doppler shift, $\Delta f$: This parameter is the difference between the frequency of the received signal, $f_R$, and the frequency of the transmitted signal, $f_0$, which is 1090 MHz in 1090ES mode. This parameter is calculated as $\Delta f = f_R - f_0$. The $f_R$ is given by:

$$f_R = \left(\frac{c + \beta \cdot v_{R \to T}}{c + \beta \cdot v_{T \to R}}\right) f_0 \quad (4)$$

where c is the speed of light, $f_0$ is the frequency of the transmitted signal, $v_{R \to T}$ is the ownship ground velocity component toward the transmitter, $v_{T \to R}$ is the transmitter ground velocity component toward the ownship, and $\beta \in \{-1, +1\}$ is defined as:

$$\beta = \text{sign}(Lon_T - Lon_R) \quad (5)$$

where $$\text{sign}(x) = \begin{cases} +1 & x > 0 \\ 0 & x = 0 \\ -1 & x < 0 \end{cases} \quad (6)$$

Because the heading of every aircraft can be different from the line connecting the two aircraft coordinates, the following equations can be used to calculate the component of the aircraft velocities toward each other:

$$v_{R \to T} = v_R \cdot \cos(\theta - H_R) \quad (7)$$

$$v_{T \to R} = v_T \cdot \cos(\theta - H_T) \quad (8)$$

where $H_R$ and $H_T$ are the ownship and transmitter headings in degrees with respect to the true north, respectively. $H_T$ is derived from the content of the received ADS-B message.

The azimuth angle, $\theta$, between the two aircraft coordinates is given by:

$$\theta = \text{atan } 2(\varphi, \phi) \quad (9)$$

where $$\varphi = \cos(Lat_T) \cdot \sin(Lon_T - Lon_R) \quad (10)$$

and therefore $$\phi = \cos(Lat_R) \cdot \sin(Lat_T) - \sin(Lat_R) \cdot \cos(Lat_T) \cdot \cos(Lon_T - Lon_R) \quad (11)$$

Energy statistic of the received signal (E): The energy statistic, E, of the received signal is calculated as:

$$E = \int_{-\infty}^{+\infty} |x(t)|^2 dt \quad (12)$$

where x(t) is the received signal and is given by $$x(t) = s(t) + w(t) \quad (13)$$

where s(t) is the transmitted signal and w(t) is the noise component. The pulse position modulation of the ADS-B 1090ES data link format implies that the ADS-B message is composed of m=112 pulses with different time positions to encode the information to be transmitted. The transmitted signal s(t) can be represented as follows:

$$s(t) = A \cdot \left[\sum_{m=1}^{112} rect\left(\frac{t - 2mT + c_m T + T/2}{T}\right)\right] \sin(2\pi f_c t) \quad (14)$$

where A is the amplitude of the signal, rect(·) is the rectangular pulse, $c_m$ is the bit sequence to be transmitted, T is the pulse duration and $f_c$ is the carrier frequency.

Bad packet ratio (BPR): BPR is a parameter that is calculated by various systems that transmit or receive information. For example, ADS-B systems may use data error detection techniques to verify whether the received packet has not been corrupted, such as a cyclic redundancy check (CRC). In an example, when the data error detection technique shows that a packet is corrupted, this packet is dropped, a running count of the number of bad packets is incremented, and the BPR is updated as the ratio of the number of bad packets to the total number of packets. A high Blit can indicate various transmission issues, including cyber-attacks.

Mean Eigenvalues of the received signal covariance matrix (EGV): To calculate this parameter, $N_t$ received signal samples, x[n], are obtained and stored in an array as:

$$[x[0],x[1],x[2],\ldots,x[N_t-1]] \quad (17)$$

An $L \times N_t$ dimension matrix is formed, where each row of the matrix is comprised of L time-shifted versions of the received signal samples x[n], as shown by:

$$X = \begin{pmatrix} x_{1,1} & \cdots & x_{1,N} \\ \vdots & \ddots & \vdots \\ x_{L,1} & \cdots & x_{L,N} \end{pmatrix} \quad (18)$$

where $x_{i,j}$ is the received signal vector sample, L is the number of Eigenvalues and $N_t$ is the length of the received signal vector. The sample covariance matrix is computed as the product of the matrix, X, and its Hermitian transpose, $X^H$, averaged over $N_t$ samples, which is given by:

$$\hat{R}_x = \frac{1}{N_t} X X^H \quad (19)$$

The Eigenvalues of the resulting L×L matrix and their mean are then computed.

Signal-to-noise ratio (SNR): This parameter is estimated using the Eigenvalues of the received signal covariance matrix, such as Eigenvalues calculated as shown above. A value M is estimated using the maximum descriptive length. After estimating M, the array of eigenvalues is split to two groups: noise group and transmitted signal group. Then, based on two distributions, the Marchenko-Pastur distribution and empirical distribution of noise group Eigenvalues, the noise power is estimated.

Rate of climb ($c_r$): This parameter corresponds to the difference in altitude reported in every two consecutive ADS-B messages received from an aircraft.

Rate of turn ($t_r$): This parameter corresponds to the difference in the heading of two consecutive ADS-B messages of an aircraft.

Displacement rate ($d_r$): This parameter is used to monitor the difference in displacement (movement) of two consecutive ADS-B messages of an aircraft. This rate is dependent on the aircraft speed.

Speed rate ($v_r$): This parameter corresponds to the difference in speed reported in two consecutive ADS-B messages of an aircraft.

The ADS-B attack detection signal parameters shown in Table 1 may be grouped to provide improved detection for specific attacks. A group of jamming attack parameters 122 may include mean eigenvalue (EGV), signal-to-noise ratio (SNR), received signal strength (RSS), bad packet ratio (BPR), and energy test statistic (E). Similarly, a group of injection attack parameters 124 may include ownship latitude ($Lat_R$), ownship longitude ($Lon_R$), transmitter latitude ($Lat_T$), transmitter longitude ($Lon_T$), velocity difference ($\Delta v$), doppler shift ($\Delta f$), and received signal strength (RSS). A group of message modification attack parameters 126 may include received signal strength (RSS), bad packet ratio (BPR), rate of climb ($c_r$), rate of turn ($t_r$), speed rate ($v_r$), and displacement rate ($d_r$). Each of these groups of signal parameters have been selected specifically for the jamming attack parameters 122, the injection attack parameters 124, and the message modification attack parameters 126 to provide improved ADS-B attack detection performance. In an embodiment, each of these groups of signal parameters improves or maximizes respective accuracies and probabilities of detection, and reduces or minimizes respective probabilities of miss detection and probabilities of false alarm.

Subsystem B 130, the attack detection subsystem, may implement attack detection using various attack detection blocks based on parameters received from Subsystem A 120. Subsystem B 130 may include three machine learning algorithms, including jamming attack detection 132, injection attack detection 134, and modification attack detection 136. In an embodiment, a random forest algorithm is used for jamming attack detection 132, and neural networks are used for injection attack detection 134, and modification attack detection 136. Each of the detection blocks 132-136 classify the incoming signals in real-time based on the provided characteristics of the signal.

Jamming attack detection 132 may receive the group of jamming attack parameters 122, which includes mean eigenvalue (EGV), signal-to-noise ratio (SNR), received signal strength (RSS), bad packet ratio (BPR), and energy, test statistic (E). These parameters are provided to a random forest algorithm to detect abnormalities in the signals. This jamming detection algorithm includes an ensemble of decision tree classifiers in which each classifier is created by means of a vector sampled randomly and independently from the input vector, and each tree provides a unit vote for the most popular class to classify an input vector. The classification of data is performed by taking the majority voted class from all the tree predictors in the forest. The ensemble of B=15 trees is given as $$\{T_1(X), T_2(X), \ldots, T_B(X)\}, B=1, \ldots, 15 \quad (20)$$

where $X=\{x_1, \ldots, x_5\}$ is a 5-dimensional vector of the input signal characteristics corresponding to EGV, SNR, RSS, BPR, and E. The ensemble generates B=15 outputs as $$\{\hat{y}_1, \hat{y}_2, \ldots, \hat{y}_B\} \quad (21)$$

where $\hat{y}_i = T_i(x_1, \ldots, x_5)$ denotes the prediction of decision tree i and i=1, ..., 15. Outputs of all trees are aggregated to produce one final classification decision, $\hat{Y} \in (0,1)$, as $$\hat{Y} = \text{Majority } \{\hat{y}_1, \hat{y}_2, \ldots, \hat{y}_B\} \quad (22)$$

Jamming attack detection block 132 provides this classification decision $\hat{Y}$ as the jamming attack detection output to Subsystem C 140.

Injection attack detection 134 may receive the group of injection attack parameters 124, including ownship latitude ($Lat_R$), ownship longitude ($Lon_R$), transmitter latitude ($Lat_T$), transmitter longitude ($Lon_T$), velocity difference ($\Delta v$), doppler shift ($\Delta f$), and received signal strength (RSS). Injection attack detection 134 uses its received parameters to provide Subsystem C 140 with a binary decision about presence or absence of the attack. Given the input vector ($a_j^{(1)} = x_j$, j=1, ... 7), initialized weights, and initialized bias values to the neural network, the output, $a_1^{(4)}$, which is the prediction on the presence or absence of the attacker, can be computed as:

$$z_j^{(l)} = \Sigma_k w_{jk}^{(l)} a_k^{(l-1)} + b_j^{(l)}, \ l=1, \ldots, 4 \quad (23)$$

$$a_j^{(l)} = g(z_j^{(l)}), \ l=1, \ldots, 4 \quad (24)$$

where the activation and bias of neuron j in layer l are denoted by $a_j^{(l)}$ and $b_j^{(l)}$, respectively, the weight from the $k^{th}$ neuron in the $(l-1)^{th}$ layer to the $j^{th}$ neuron in the $l^{th}$ layer is denoted by $w_{jk}^{(l)}$ and $g(\cdot)$ is called the activation function. The activation function used is hyperbolic tangent (tanh) which is given by:

$$g_{tanh}(z) = \frac{2}{1+e^{-2z}} - 1 \quad (25)$$

Injection attack detection 134 uses its received parameters to provide Subsystem C 140 with output, $a_1^{(4)}$, which is the prediction on the presence or absence of the attacker.

Modification attack detection 136 may receive the group of message modification attack parameters 126, including received signal strength (RSS), bad packet ratio (BPR), rate of climb ($c_r$), rate of turn ($t_r$), speed rate ($v_r$), and displacement rate ($d_r$). Similar to the neural network algorithm for injection attack detection 134, the neural network of the modification attack detector 136 provides an output determination as to whether the signal under consideration is modified or not. This includes calculating $a^{(l)}$, as:

$$z^{(l)} = w^{(l)}a^{(l-1)} + b^{(l)} \quad (26)$$

$$a^{(l)} = g_{tanh}(z^{(l)}) \quad (27)$$

in which $a^{(l)}$ denotes the vector of activation values of neurons in layer l, $b^{(l)}$ represents the bias vector in the same layer, $w^{(l)}$ denotes the vector of weights from layer l–1 to layer l. Modification attack detection 136 uses its received parameters to provide Subsystem C 140 with output $a^{(l)}$.

Subsystem C 140 may implement Bayesian inference processing for each type of attack. Subsystem C 140 may use Bayesian models to calculate the probability that each type of attack will happen, to calculate the probability of detection, or provide other calculations. Subsystem C 140 uses Bayesian methodologies to generate an estimate of the probability of detection, probability of false alarm, and accuracy of the attack based on past and present data. In an embodiment, Subsystem C 140 may use a periodicity of 20 seconds, though this periodicity may be increased or decreased based on the environment of the ADS-B system 100.

In the Bayesian models used in Subsystem C 140, prior knowledge of the attacks is used to compute the posterior probability distribution of the attacks when a new ADS-B message is received. This posterior probability, $Post_{Att}$, is calculated as:

$$Post_{Att} = Prior_{Att} \times Lik_{Att} \quad (28)$$

$$Lik_{Att} = (P_{Att})^{ATProb} \times (1-P_{Att})^{1-ATProb} \quad (29)$$

where $P_{Att}$ denotes the set of probability values from 0 to 1, ATProb is the attack presence probability, which depends on the probabilities of detection and false alarm for the attack detection technique, $Prior_{Att}$ is the prior probability distribution, and $Post_{Att}$ is the posterior probability distribution. The maximum value of $Post_{Att}$ is considered as the attack rate and taken as $Prior_{Occ}$ for the next iteration.

The probabilities of detection and false alarm represent the accuracy of the detection technique. In order to include detection inaccuracies in the estimation of the attack rate, ATProb is defined as a probability conditioned to these two parameters. When an attack is detected, $A_D=1$, the attack presence probability can be given as follows:

$$ATProb = P(A_P = 1 \mid A_D = 1) = \quad (30)$$

$$\frac{P(A_D = 1 \mid A_P = 1)P(A_P = 1)}{P(A_D = 1 \mid A_P = 1)P(A_P = 1) + P(A_D = 1 \mid A_P = 0)P(A_P = 0)} = \frac{P_D P(A_P = 1)}{P_D P(A_P = 1) + P_{FA} P(A_P = 0)}$$

where $A_P$ denotes the attack presence, $A_D$ denotes the decision of the detection technique, $P(A_P=1)$ and $P(A_P=0)$ are the a priori probabilities that the attack is present and absent, respectively, $P(A_D=1 \mid A_P=1)$ represents the probability of detection, $P_D$, and $P(A_D=1 \mid A_P=0)$ represents the false alarm probability, $P_{FA}$. When no attack is detected, $A_D=0$, the attack presence probability is given by:

$$ATProb = P(A_P = 1 \mid A_D = 0) = \frac{P(A_D = 0 \mid A_P = 1)P(A_P = 1)}{P(A_D = 0 \mid A_P = 1)P(A_P = 1) + P(A_D = 0 \mid A_P = 0)P(A_P = 0)} = \quad (31)$$

$$\frac{P_{MD}P(A_P = 1)}{P_{MD}P(A_P = 1) + (1 - P_{FA})P(A_P = 0)}$$

where $P(A_D=0 \mid A_P=1)$ represents the probability of misdetection, $P_{MD}$. After calculating ATProb, the attack rate can be calculated by finding the maximum of $Post_{Att}$. Subsystem C 140 may generate the estimate of the probability of detection, probability of false alarm, and accuracy of the attack based on past and present data, and provide these outputs to Subsystem D 150.

Subsystem D 150 may implement decision-making and provide an ADS-B system output 160, which may include the ADS-B cyber-attack type and probability. Subsystem D 150 may receive the output from Subsystem C 140 from all three detection algorithms, including attack type, attack rate, $Post_{Att}$, and the attack presence probability, ATProb. Subsystem D 150 synthesizes (e.g., analyzes and combines) the information, and provide an attack type and probability of attack as ADS-B system output 160. The attack type and probability of attack may include identification of a single attack associated with the highest probability or associated with the greatest severity (e.g., threat to commercial airline operation). The attack type and probability of attack may include identification of multiple types of attack, which may be organized based on order of probability, severity, or other ordering criteria.

The ADS-B system output 160 may include identification of one or more warnings, alerts, and attacks. The ADS-B system output 160 may be associated with specific visible, audible, tactile, or other indicators. For example, ADS-B system output 160 may be used to notify an air controller by using red, yellow, and green visual indicators to indicate one or more attack types, attack probabilities, attack severities, and other attack information.

Figure 2:
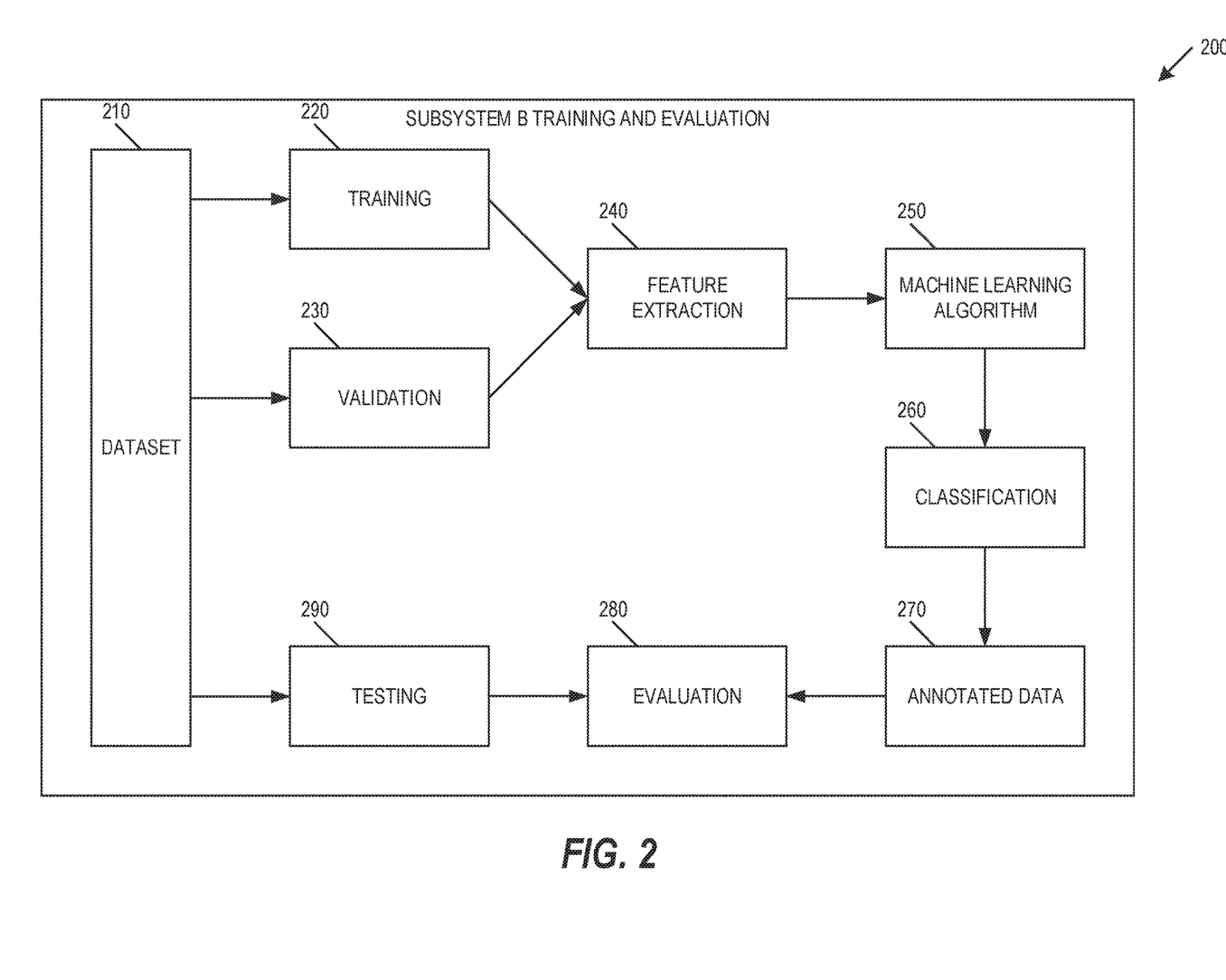
FIG. 2 is a diagram of an attack detection subsystem training and evaluation methodology, in accordance with at least one embodiment.

FIG. 2 is a diagram of an attack detection subsystem training and evaluation methodology 200, in accordance with at least one embodiment. As shown in FIG. 1, Subsystem B 130 may provide functionality for jamming attack detection 132, injection attack detection 134, or modification attack detection 136. The attack detection subsystem training and evaluation methodology 200 may provide training and evaluation for each type of attack detection machine learning algorithm.

The training and evaluation methodology 200 methodology may be based on an input dataset 210. The input dataset 210 may include ADS-B data, such as ADS-B data gathered from OpenSky Network or other ADS-B data sources. A portion of the input dataset 210 may be allocated to a training data set 220. For initial training, the training data set 230 is fed to feature extraction 240, such as to identify features specific to each of the jamming attack detection 132, injection attack detection 134, or modification attack detection 136. Once features are extracted at feature extraction 240, the extracted features are provided to a machine learning algorithm 250. The machine learning algorithm 250 may include machine learning specific to each attack detection. In an embodiment, a random forest algorithm is used for jamming attack detection 132, and neural networks are used for injection attack detection 134, and modification attack detection 136. The machine learning algorithm 250 generates a classification output 260, such as to classify an attack type and probability of attack. The classification output 260 may be combined with the training data set 220 to generate annotated data 270, such as including ADS-B attack metadata information associated with at least a portion of the training data set 220. The annotated data 270 may be provided to evaluation 280, such as for evaluating the performance (e.g., accuracy) of each type of attack detection.

A portion of the input dataset 210 may be allocated to a validation data set 230. The validation data set 230 includes data from the input dataset 210 that is mostly or completely different from data allocated to the training data set 220 to provide unbiased evaluation and to generate updated parameters use within the respective machine learning algorithm 250. The use of different data from the validation data set 230 and the training data set 220 improves the ability of the system to validate detection of each attack type. The validation data set 230 may be fed to feature extraction 240, extracted features are provided to the machine learning algorithms 250, a classification output 260 may be combined with validation data set 230 to generate annotated data 270, and the annotated data 270 may be provided to evaluation 280. Evaluation 280 may assess the performance of the respective machine learning algorithm 250, which may be used to generate updated parameters use within the respective machine learning algorithm 250.

A portion of the input dataset 210 may be allocated to a testing data set 290. The testing data set 290 includes data from the input dataset 210 that is mostly or completely different from data allocated to either the training data set 220 or to the validation data set 230. The testing data set 290 may be used within evaluation 280 to provide unbiased evaluation of the performance of the respective machine learning algorithm 250. Various metrics may be used to determine the performance of the respective machine learning algorithm 250, such as probability of detection, $P_D$, probability of false alarm, $P_{FA}$, probability of miss detection, $P_{MD}$, and accuracy. These metrics are given by:

$$P_D = P(A_D=1 | A_P=1) \qquad (32)$$

$$P_{FA} = P(A_D=1 | A_P=0) \qquad (33)$$

$$P_{MD} = P(A_D=0 | A_P=1) \qquad (34)$$

$$\text{Accuracy} = P(A_D=1 | A_P=1) + P(A_D=0 | A_P=0) \qquad (35)$$

The first three metrics are described above. The accuracy metric is defined as the combined probability that both legitimate and fake messages are detected correctly as legitimate and fake messages, respectively.

In an embodiment, the selection of the specific type of machine learning algorithm and selection of specific groups of signal parameters have been selected to improve or maximize respective accuracies and probabilities of detection, and to reduce or minimize respective probabilities of miss detection and probabilities of false alarm. An example result of these selections of machine learning algorithm type and specific groups of signal parameters are shown in Table 2:

TABLE 2

ADS-B Attack Detection Performance

| Type of Attack | Method/Metric | $P_D$ | $P_{MD}$ | $P_{FA}$ | Accuracy |
|---|---|---|---|---|---|
| Jamming | Neural Network | 98.5% | 1.5% | 0.4% | 99% |
| Message Injection | Random Forest | 97.4% | 2.4% | 1.5 | 98% |
| Modification | Neural Network | 98.5% | 1.5% | 0.4% | 99% |

As shown in Table 2, the selection of machine learning algorithm type and specific groups of signal parameters results in very high accuracy and probability of detection while reducing or minimizing false alarm and miss detection probabilities.

Figure 3:
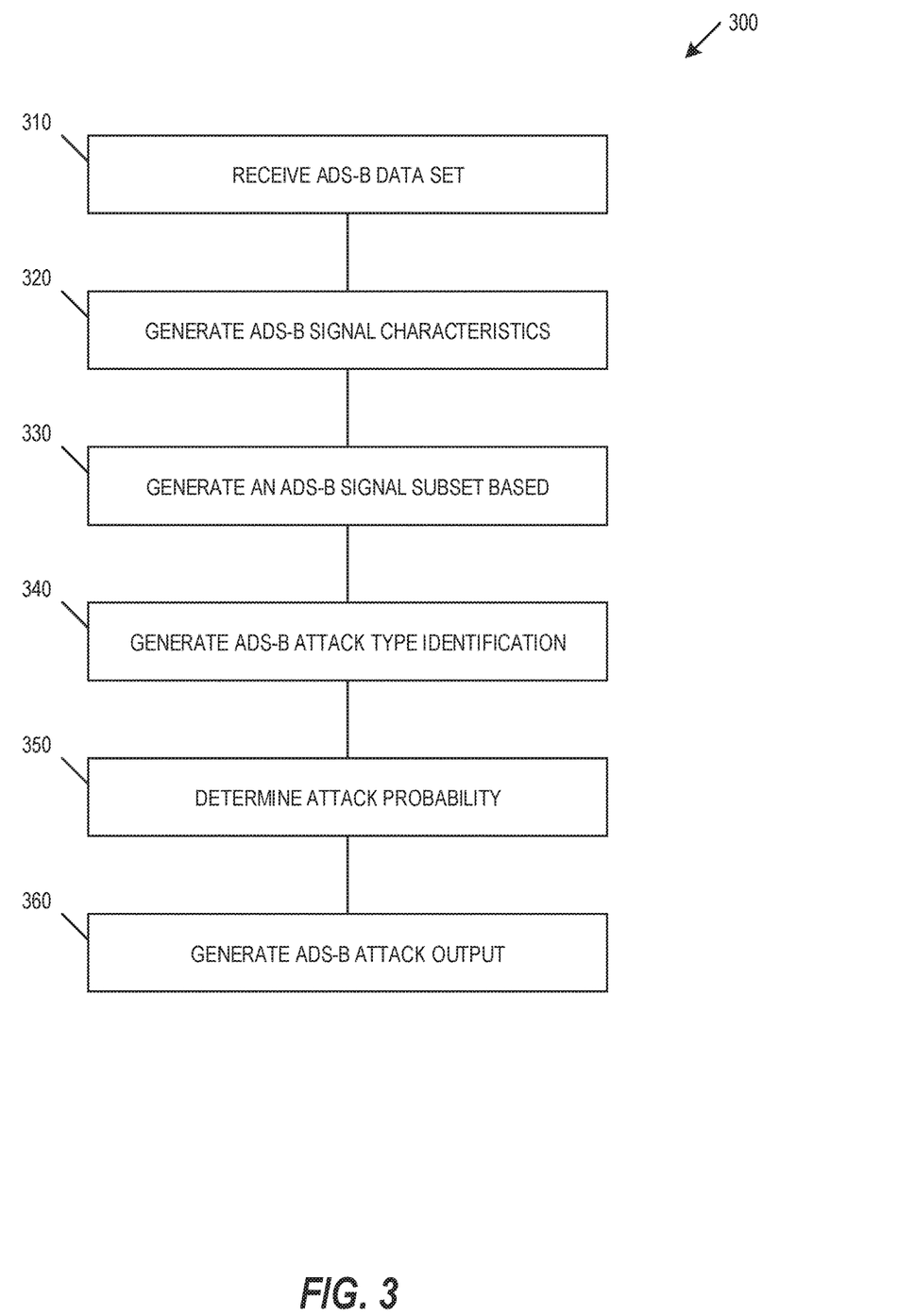
FIG. 3 is a diagram of an ADS-B cyber-attack detection and mitigation method, in accordance with at least one embodiment.

FIG. 3 is a diagram of an ADS-B cyber-attack detection and mitigation method 300, in accordance with at least one embodiment. Method 300 may include receiving 310 an ADS-B data set, such as from a ADS-B signal receiver. The ADS-B signal receiver may include an ADS-B RF signal receiver, an input device to read plaintext ADS-B data, or other device to receive the ADS-B data set. Method 300 may include generating 320 a plurality of ADS-B signal characteristics based on the ADS-B data set. Method 300 may include generating 330 an ADS-B signal subset based on the plurality of ADS-B signal characteristics and on an ADS-B cyber-attack type, such as described above with respect to Subsystem A 120. The ADS-B signal subset may include EGV, SNR, RSS, BPR, and E for an ADS-B jamming attack, include $Lat_R$, $Lon_R$), $Lat_T$, $Lon_T$, $\Delta v$, $\Delta f$, and RSS for an ADS-B injection attack, and may include RSS, BPR, $c_r$, $t_r$, $v_r$, and $d_r$ for an ADS-B modification attack. Method 300 may include generating 340 an ADS-B attack type identification based on an ADS-B machine learning analysis of the ADS-B signal subset; such as described above with respect to Subsystem B 130. Method 300 may include determining 350 an attack probability based on the ADS-B attack type identification and the ADS-B signal subset, such as described above with respect to Subsystem C 140. Method 300 may include generating 360 an ADS-B attack output based on the determined attack probability and the ADS-B attack type, such as described above with respect to Subsystem D 150.

Figure 4:
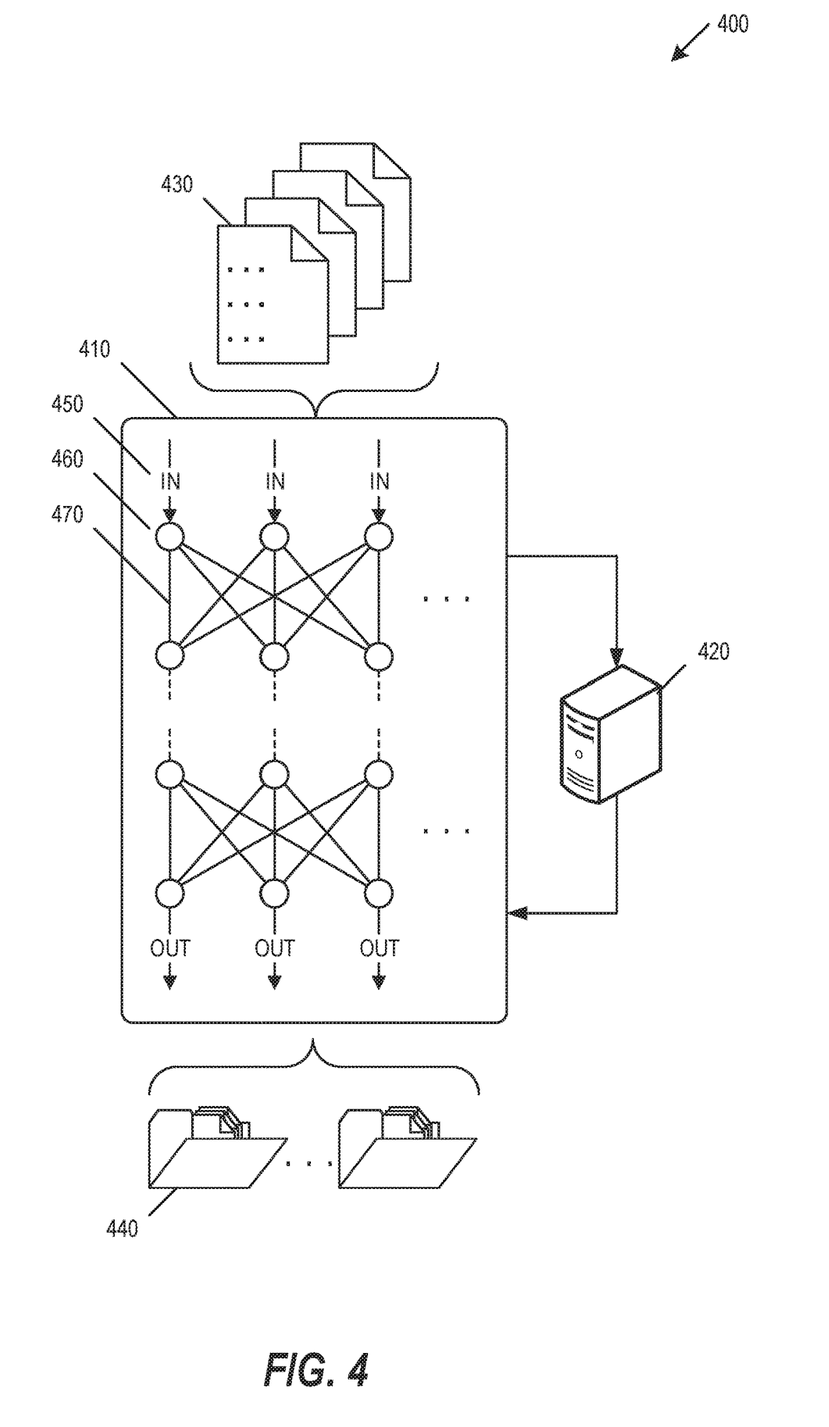
FIG. 4 is a block diagram of an example neural network training system for ADS-B cyber-attack detection, according to an embodiment.

FIG. 4 is a block diagram of an example neural network training system 400 for ADS-B cyber-attack detection, according to an embodiment. The ADS-B cyber-attack classification may include an artificial intelligence (AI) analysis of ADS-B cyber-attack data characteristics. As used herein, AI analysis is a field concerned with developing decision-making systems to perform cognitive tasks that have traditionally required a living actor, such as a person. The AI analysis of ADS-B cyber-attack detection may be performed by an artificial neural network (ANN) algorithm using specific ADS-B cyber-attack classifiers described herein. An ANN includes a computational structure that may be loosely modeled on biological neurons. Generally, ANNs encode information (e.g., data or decision making) via weighted connections (e.g., synapses) between nodes (e.g., neurons). Modern ANNs are foundational to many AI applications, such as automated perception (e.g., computer vision, speech recognition, contextual awareness; etc.); automated cognition (e.g.; decision-making, logistics, routing, supply chain optimization, etc.), automated control (e.g., autonomous cars, drones, robots, etc.), among others.

Many ANNs are represented as matrices of weights that correspond to the modeled connections. ANNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the ANN graph if the threshold is not exceeded then, the value is usually not transmitted to a down-graph neuron and the synaptic connection remains inactive. The process of weighting and testing continues until an output neuron is reached; the pattern and values of the output neurons constituting the result of the ANN processing.

The correct operation of most ANNs relies on correct weights. However, ANN designers may not know which weights will work for a given application. ANN designers typically choose a number of neuron layers or specific connections between layers including circular connection, but the ANN designer does may not know which weights will work for a given application. Instead, a training process is used to arrive at appropriate weights. However, determining correct synapse weights is common to most ANNs. The training process proceeds by selecting initial weights, which may be randomly selected. Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function a cost or loss function), whereby the cost or loss is minimized.

Backpropagation is a technique whereby training data is fed forward through the ANN, where "forward" means that the data starts at the input neurons and follows the directed graph of neuron connections until the output neurons are reached, and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs.

The ADS-B cyber-attack detection and mitigation system 400 may include an ANN 410 that is trained using a processing node 420. The processing node 420 may be a CPU, CPU, field programmable gate array (FPGA), digital signal processor (DSP), application specific integrated circuit (ASIC), or other processing circuitry. In an example, multiple processing nodes may be employed to train different layers of the ANN 410, or even different nodes 460 within layers. Thus, a set of processing nodes 420 is arranged to perform the training of the ANN 410.

The set of processing nodes 420 is arranged to receive a training set 430 for the ANN 410. The training set 430 may include previously stored data from one or more ADS-B receivers. The ANN 410 comprises a set of nodes 460 arranged in layers (illustrated as rows of nodes 460) and a set of inter-node weights 470 (e.g., parameters) between nodes in the set of nodes. In various embodiments, an ANN 410 may use as few as two layers of nodes, or the ANN 410 may use as many as ten or more layers of nodes. The number of nodes 460 or number of node layers may be selected based on the type and complexity of the ADS-B cyber-attack detection system. In various examples, the ANN 410 includes a node layer corresponding to multiple sensor types, a node layer corresponding to multiple perimeters of interest, and a node layer corresponding to compliance with requirements under 14 C.F.R. 107. In an example, the training set 430 is a subset of a complete training set of data from one or more ADS-B receivers. Here, the subset may enable processing nodes with limited storage resources to participate in training the ANN 410.

The training data may include multiple numerical values representative of an ADS-B cyber-attack compliance classification 440, such as compliant, noncompliant unintentional, and noncompliant intentional. During training, each value of the training is provided to a corresponding node 460 in the first layer or input layer of ANN 410. Once ANN 410 is trained, each value of the input 450 to be classified is similarly provided to a corresponding node 460 in the first layer or input layer of ANN 410. The values propagate through the layers and are changed by the objective function.

As noted above, the set of processing nodes is arranged to train the neural network to create a trained neural network, Once trained, the input ADS-B data 450 will be assigned into categories such that data input into the ANN 410 will produce valid ADS-B cyber-attack classifications 440. Training may include supervised learning, where portions of the training data set are labeled using ADS-B cyber-attack classifications 440. After an initial supervised learning is completed, the ANN 410 may undergo unsupervised learning, where the training data set is not labeled using ADS-B cyber-attack classifications 440. For example, the ANN 410 may be trained initially by supervised learning using previously classified ADS-B data, and subsequently trained by unsupervised learning using newly collected ADS-B data. This unsupervised learning using newly collected ADS-B data enables the system to adapt to a specific ADS-B cyber-attack detection types. This unsupervised learning also enables the system to adapt to changes in the ADS-B cyber-attack types.

The training performed by the set of processing nodes 460 is iterative. In an example, each iteration of the training the neural network is performed independently between layers of the ANN 410. Thus, two distinct layers may be processed in parallel by different members of the set of processing nodes. In an example, different layers of the ANN 410 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 460 (e.g., neurons) are trained independently. In an example, the nodes are trained on different hardware.

The number and types of ADS-B cyber-attack classifications 440 may be modified to add, remove, or modify ADS-B cyber-attack classifications 440. This may enable the ANN 410 to be updated via software, which may enable modification of the ADS-B cyber-attack detection system without replacing the entire system. A software update of the ADS-B cyber-attack classifications 440 may include initiating additional supervised learning based on a newly provided set of input data with associated ADS-B cyber-attack classifications 440. A software update of the ADS-B cyber-attack classifications 440 may include replacing the currently trained ANN 410 with a separate ANN 410 trained using a distinct set of input data or ADS-B cyber-attack classifications 440.

Figure 5:
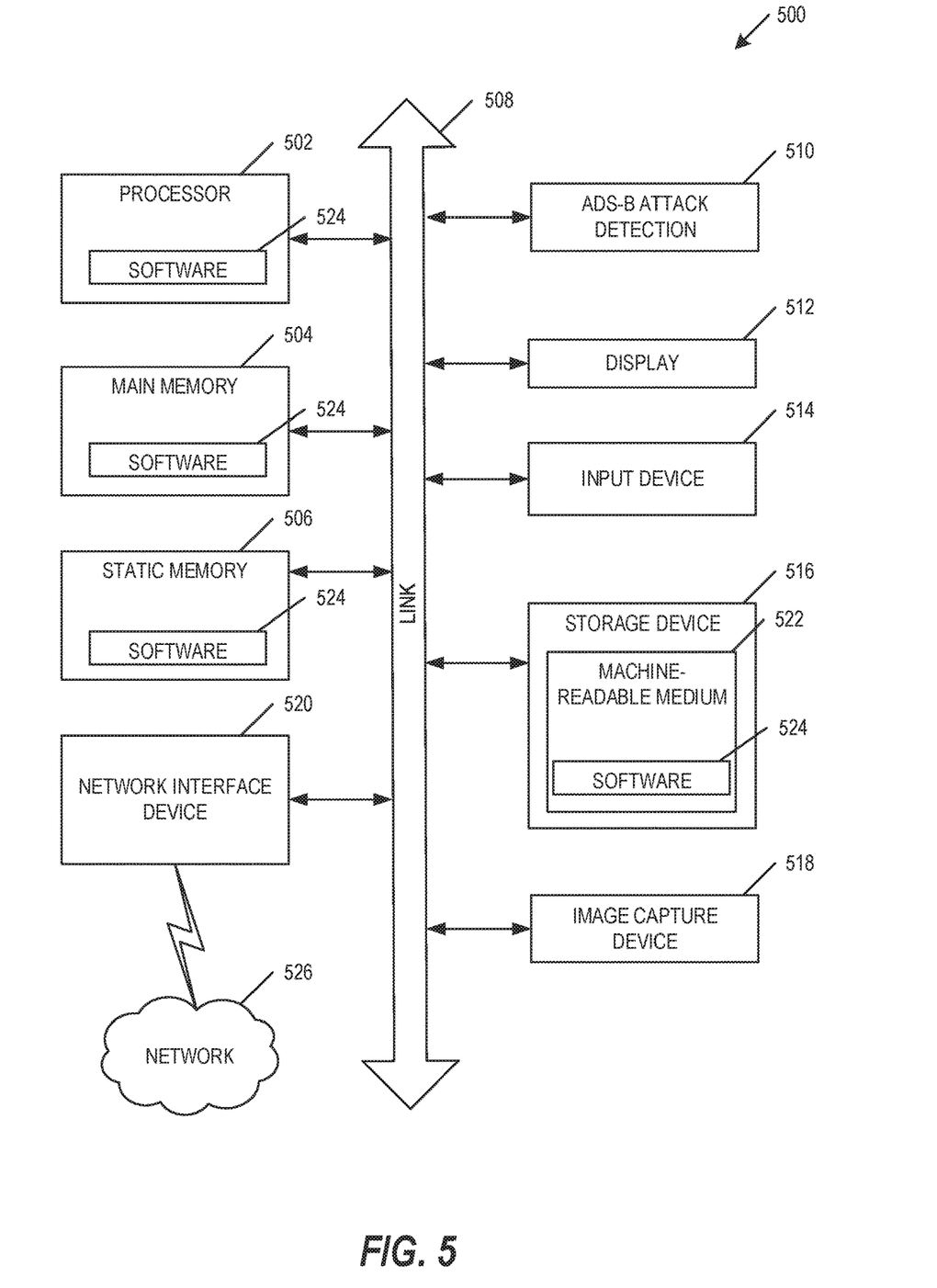
FIG. 5 is a block diagram illustrating an ADS-B cyber-attack detection and mitigation system in an example form of an electronic device, according to an example embodiment.

FIG. 5 is a block diagram illustrating an ADS-B cyber-attack detection and mitigation system in an example form of an electronic device 500, within which a set or sequence of instructions may be executed to cause the machine to perform any one of the methodologies discussed herein, according to an example embodiment. Electronic device 500 may represent a single device or a system of multiple devices combined to provide ADS-B cyber-attack detection and mitigation. In alternative embodiments, the electronic device 500 operates as a standalone device or may be connected (e.g., networked) to other machines. In a networked deployment, the electronic device 500 may operate in the capacity of either a server or a client machine in server-client network environments, or it may act as a peer machine in peer-to-peer distributed) network environments. The electronic device 500 may be implemented on a System-on-a-Chip (SoC), a System-in-a-Package (SiP), an integrated circuit (IC), a portable electronic device, a personal computer (PC), a tablet PC, a hybrid tablet, a personal digital assistant (PDA), a mobile telephone, a server computer, or any electronic device 500 capable of executing instructions (sequential or otherwise) that specify actions to be taken by that machine to detect a user input. Further, while only a single electronic device 500 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The main memory 504 or static memory 506 may be used to store navigation data (e.g., predetermined waypoints) or payload data (e.g., stored captured images).

The electronic device 500 may include one or more ADS-B cyber-attack detection components 510, which may provide various ADS-B cyber-attack detection data to perform the detection and mitigation processes described above. The ADS-B cyber-attack detection components 510 may include an ADS-B RF signal receiver, an input device to read plaintext ADS-B data, or other device to receive the ADS-B data set. The ADS-B cyber-attack detection components 510 may include processing specific to ADS-B cyber-attack detection, such as a GPU dedicated to machine learning. In an embodiment, certain ADS-B cyber-attack detection processing may be performed by one or both of the processor 502 and the ADS-B cyber-attack detection components 510. Certain ADS-B cyber-attack detection processing may be performed only by the ADS-B cyber-attack detection components 510, such as machine learning training or evaluation performed on a GPU dedicated to machine learning.

The electronic device 500 may further include a display unit 512, where the display unit 512 may include a single component that provides a user-readable display and a protective layer, or another display type. The electronic device 500 may further include an input device 514, such as a pushbutton, a keyboard, or a user interface (UI) navigation device (e.g., a mouse or touch-sensitive input). The electronic device 500 may additionally include a storage device 516, such as a drive unit. The electronic device 500 may additionally include one or more image capture devices 518 to capture images with different fields of view as described above. The electronic device 500 may additionally, include a network interface device 520, and one or more additional sensors (not shown).

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, or within the processor 502 during execution thereof by the electronic device 500. The main memory 504, static memory 506, and the processor 502 may also constitute machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 5G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

To better illustrate the method and apparatuses disclosed herein, a non-limiting list of embodiments is provided here.

Example 1 is an automatic dependent surveillance-broadcast (ADS-B) cyber-attack detection system comprising: an ADS-B signal receiver to receive an ADS-B data set; one or more processors; and one or more storage devices comprising instructions, which when executed by the one or more processors, configure the one or more processors to: receive the ADS-B data set from the ADS-B signal receiver; generate a plurality of ADS-B signal characteristics based on the ADS-B data set; generate an ADS-B signal subset based on the plurality of ADS-B signal characteristics and on an ADS-B cyber-attack type; generate an ADS-B attack type identification based on an ADS-B machine learning analysis of the ADS-B signal subset; determine an attack probability based on the ADS-B attack type identification and the ADS-B signal subset; and generate an ADS-B attack output based on the determined attack probability and the ADS-B attack type.

In Example 2, the subject matter of Example 1 optionally includes wherein: the ADS-B cyber-attack type includes an ADS-B jamming attack; and the ADS-B signal subset includes an ADS-B jamming attack signal subset, the ADS-B jamming attack signal subset including a mean eigenvalue, signal-to-noise ratio, received signal strength, bad packet ratio, and energy test statistic.

In Example 3, the subject matter of Example 2 optionally includes wherein the ADS-B machine learning analysis includes a jamming attack random forest machine learning analysis, the jamming attack random forest machine learning analysis previously trained on a set of ADS-B jamming attack training data.

In Example 4, the subject matter of any one or more of Examples 1-3 optionally include wherein: the ADS-B cyber-attack type includes an ADS-B message injection attack; and the ADS-B signal subset includes an ADS-B injection attack signal subset, the ADS-B injection attack signal subset including ownship latitude, ownship longitude, transmitter latitude, transmitter longitude, velocity difference, doppler shift, and received signal strength.

In Example 5, the subject matter of Example 4 optionally includes wherein the ADS-B machine learning analysis includes a signal injection attack neural network machine learning analysis, the signal injection attack neural network machine learning analysis previously trained on a set of ADS-B message injection attack training data.

In Example 6, the subject matter of any one or more of Examples 1-5 optionally include wherein: the ADS-B cyber-attack type includes an ADS-B message modification attack; and the ADS-B signal subset includes an ADS-B message modification attack signal subset, the ADS-B message modification attack signal subset including received signal strength, bad packet ratio, rate of climb, rate of turn, speed rate, and displacement rate.

In Example 7, the subject matter of Example 6 optionally includes wherein the ADS-B machine learning analysis includes a message modification attack neural network machine learning analysis, the message modification attack neural network machine learning analysis previously trained on a set of ADS-B message modification attack training data.

In Example 8, the subject matter of any one or more of Examples 1-7 optionally include wherein the determination of the attack probability includes Bayesian inference processing of the ADS-B attack type identification and the ADS-B signal subset.

In Example 9, the subject matter of Example 8 optionally includes wherein the attack probability includes at least one of a probability of detection, a probability of false alarm, and an accuracy.

Example 10 is an automatic dependent surveillance-broadcast (ADS-B) cyber-attack detection method comprising: receiving an ADS-B data set from a ADS-B signal receiver; generating a plurality of ADS-B signal characteristics based on the ADS-B data set; generating an ADS-B signal subset based on the plurality of ADS-B signal characteristics and on an ADS-B cyber-attack type; generating an ADS-B attack type identification based on an ADS-B machine learning analysis of the ADS-B signal subset; determining an attack probability based on the ADS-B attack type identification and the ADS-B signal subset; and generating an ADS-B attack output based on the determined attack probability and the ADS-B attack type.

In Example 11, the subject matter of Example 10 optionally includes wherein: the ADS-B cyber-attack type includes an ADS-B jamming attack; and the ADS-B signal subset includes an ADS-B jamming attack signal subset, the ADS-B jamming attack signal subset including a mean eigenvalue, signal-to-noise ratio, received signal strength, bad packet ratio, and energy test statistic.

In Example 12, the subject matter of Example 11 optionally includes wherein the ADS-B machine learning analysis includes a jamming attack random forest machine learning analysis, the jamming attack random forest machine learning analysis previously trained on a set of ADS-B jamming attack training data.

In Example 13, the subject matter of any one or more of Examples 10-12 optionally include wherein: the ADS-B cyber-attack type includes an ADS-B message injection attack; and the ADS-B signal subset includes an ADS-B injection attack signal subset, the ADS-B injection attack signal subset including ownship latitude, ownship longitude; transmitter latitude, transmitter longitude, velocity difference, doppler shift, and received signal strength.

In Example 14, the subject matter of Example 13 optionally includes wherein the ADS-B machine learning analysis includes a signal injection attack neural network machine learning analysis, the signal injection attack neural network machine learning analysis previously trained on a set of ADS-B message injection attack training data.

In Example 15, the subject matter of any one or more of Examples 10-14 optionally include wherein: the ADS-B cyber-attack type includes an ADS-B message modification attack; and the ADS-B signal subset includes an ADS-B message modification attack signal subset, the ADS-B message modification attack signal subset including received signal strength, bad packet ratio, rate of climb, rate of turn, speed rate, and displacement rate.

In Example 16, the subject matter of Example 15 optionally includes wherein the ADS-B machine learning analysis includes a message modification attack neural network machine learning analysis, the message modification attack neural network machine learning analysis previously trained on a set of ADS-B message modification attack training data.

In Example 17, the subject matter of any one or more of Examples 10-16 optionally include wherein the determination of the attack probability includes Bayesian inference processing of the ADS-B attack type identification and the ADS-B signal subset.

In Example 18, the subject matter of Example 17 optionally includes wherein the attack probability includes at least one of a probability of detection, a probability of false alarm, and an accuracy.

Example 19 is one or more machine-readable medium including instructions, which when executed by a computing system, cause the computing system to perform any of the methods of Examples 10-18.

Example 20 is an apparatus comprising means for performing any of the methods of Examples 10-18.

Example 21 is at least one non-transitory machine-readable storage medium, comprising a plurality of instructions that, responsive to being executed with processor circuitry of a computer-controlled device, cause the computer-controlled device to: receive an ADS-B data set from a ADS-B signal receiver; generate a plurality of ADS-B signal characteristics based on the ADS-B data set; generate an ADS-B signal subset based on the plurality of ADS-B signal characteristics and on an ADS-B cyber-attack type; generate an ADS-B attack type identification based on an ADS-B machine learning analysis of the ADS-B signal subset;

determine an attack probability based on the ADS-B attack type identification and the ADS-B signal subset; and generate an ADS-B attack output based on the determined attack probability and the ADS-B attack type.

In Example 22, the subject matter of Example 21 optionally includes wherein: the ADS-B cyber-attack type includes an ADS-B jamming attack; and the ADS-B signal subset includes an ADS-B jamming attack signal subset, the ADS-B jamming attack signal subset including a mean eigenvalue, signal-to-noise ratio, received signal strength, bad packet ratio, and energy test statistic.

In Example 23, the subject matter of Example 22 optionally includes wherein the ADS-B machine learning analysis includes a jamming attack random forest machine learning analysis, the jamming attack random forest machine learning analysis previously trained on a set of ADS-B jamming attack training data.

In Example 24, the subject matter of any one or more of Examples 21-23 optionally include wherein: the ADS-B cyber-attack type includes an ADS-B message injection attack; and the ADS-B signal subset includes an ADS-B injection attack signal subset, the ADS-B injection attack signal subset including ownship latitude, ownship longitude; transmitter latitude, transmitter longitude, velocity difference, doppler shift, and received signal strength.

In Example 25, the subject matter of Example 24 optionally includes wherein the ADS-B machine learning analysis includes a signal injection attack neural network machine learning analysis, the signal injection attack neural network machine learning analysis previously trained on a set of ADS-B message injection attack training data.

In Example 26, the subject matter of any one or more of Examples 21-25 optionally includes wherein: the ADS-B cyber-attack type includes an ADS-B message modification attack; and the ADS-B signal subset includes an ADS-B message modification attack signal subset, the ADS-B message modification attack signal subset including received signal strength; bad packet ratio, rate of climb, rate of turn, speed rate, and displacement rate.

In Example 27, the subject matter of Example 26 optionally includes wherein the ADS-B machine learning analysis includes a message modification attack neural network machine learning analysis, the message modification attack neural network machine learning analysis previously trained on a set of ADS-B message modification attack training data.

In Example 28, the subject matter of any one or more of Examples 21-27 optionally include wherein the determination of the attack probability includes Bayesian inference processing of the ADS-B attack type identification and the ADS-B signal subset.

In Example 29, the subject matter of Example 28 optionally includes wherein the attack probability includes at least one of a probability of detection, a probability of false alarm, and an accuracy.

Example 30 is an automatic dependent surveillance-broadcast (ADS-B) cyber-attack detection apparatus comprising: means for receiving an ADS-B data set from a ADS-B signal receiver; means for generating a plurality of ADS-B signal characteristics based on the ADS-B data set; means for generating an ADS-B signal subset based on the plurality of ADS-B signal characteristics and on an ADS-B cyber-attack type; means for generating an ADS-B attack type identification based on an ADS-B machine learning analysis of the ADS-B signal subset; means for determining an attack probability based on the ADS-B attack type identification and the ADS-B signal subset; and means for generating an ADS-B attack output based on the determined attack probability and the ADS-B attack type.

In Example 31, the subject matter of Example 30 optionally includes wherein: the ADS-B cyber-attack type includes an ADS-B jamming attack; and the ADS-B signal subset includes an ADS-B jamming attack signal subset, the ADS-B jamming attack signal subset including a mean eigenvalue, signal-to-noise ratio, received signal strength, bad packet ratio, and energy test statistic.

In Example 32, the subject matter of Example 31 optionally includes wherein the ADS-B machine learning analysis includes a jamming attack random forest machine learning analysis, the jamming attack random forest machine learning analysis previously trained on a set of ADS-B jamming attack training data.

In Example 33, the subject matter of any one or more of Examples 30-32 optionally include wherein: the ADS-B cyber-attack type includes an ADS-B message injection attack; and the ADS-B signal subset includes an ADS-B injection attack signal subset, the ADS-B injection attack signal subset including ownship latitude, ownship longitude, transmitter latitude, transmitter longitude, velocity difference, doppler shift, and received signal strength.

In Example 34, the subject matter of Example 33 optionally includes wherein the ADS-B machine learning analysis includes a signal injection attack neural network machine learning analysis, the signal injection attack neural network machine learning analysis previously trained on a set of ADS-B message injection attack training data.

In Example 35, the subject matter of any one or more of Examples 30-34 optionally include wherein: the ADS-B cyber-attack type includes an ADS-B message modification attack; and the ADS-B signal subset includes an ADS-B message modification attack signal subset, the ADS-B message modification attack signal subset including received signal strength, bad packet ratio, rate of climb, rate of turn, speed rate, and displacement rate.

In Example 36, the subject matter of Example 35 optionally includes wherein the ADS-B machine learning analysis includes a message modification attack neural network machine learning analysis, the message modification attack neural network machine learning analysis previously trained on a set of ADS-B message modification attack training data.

In Example 37, the subject matter of any one or more of Examples 30-36 optionally include wherein the determination of the attack probability includes Bayesian inference processing of the ADS-B attack type identification and the ADS-B signal subset.

In Example 38, the subject matter of Example 37 optionally includes wherein the attack probability includes at least one of a probability of detection, a probability of false alarm, and an accuracy.

Example 39 is one or more non-transitory machine-readable medium including instructions, which when executed by a machine, cause the machine to perform operations of any of the operations of Examples 1-38.

Example 40 is an apparatus comprising means for performing any of the operations of Examples 1-38.

Example 41 is a system to perform the operations of any of the Examples 1-38.

Example 42 is a method to perform the operations of any of the Examples 1-38.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more" In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope should be determined with reference to the appended claims, along with the full scope of equivalents to which such claims are entitled.

What is claimed is:

1. An automatic dependent surveillance-broadcast (ADS-B) cyber-attack detection system comprising:
    an ADS-B signal receiver to receive an ADS-B data set;
    one or more processors; and
    one or more storage devices comprising instructions, which when executed by the one or more processors, configure the one or more processors to:
    receive the ADS-B data set from the ADS-B signal receiver;
    generate a plurality of ADS-B signal characteristics based on the ADS-B data set;
    generate an ADS-B signal subset based on the plurality of ADS-B signal characteristics and on an ADS-B cyber-attack type, wherein the ADS-B cyber-attack type includes an ADS-B message modification attack and the ADS-B signal subset includes an ADS-B message modification attack signal subset, the ADS-B message modification attack signal subset including received signal strength, bad packet ratio, rate of climb, rate of turn, speed rate, and displacement rate;
    generate an ADS-B attack type identification based on an ADS-B machine learning analysis of the ADS-B signal subset;
    determine an attack probability based on the ADS-B attack type identification and the ADS-B signal subset; and
    generate an ADS-B attack output based on the determined attack probability and the ADS-B attack type identification.

2. The system of claim 1, wherein the ADS-B jamming attack signal subset includes at least one of a mean eigenvalue, signal-to-noise ratio, received signal strength, bad packet ratio, or energy test statistic.

3. The system of claim 2, wherein the ADS-B machine learning analysis includes a jamming attack random forest machine learning analysis, the jamming attack random forest machine learning analysis previously trained on a set of ADS-B jamming attack training data.

4. The system of claim 1, wherein:
    the ADS-B cyber-attack type includes an ADS-B message injection attack; and
    the ADS-B signal subset includes an ADS-B injection attack signal subset, the ADS-B injection attack signal subset including ownship latitude, ownship longitude, transmitter latitude, transmitter longitude, velocity difference, doppler shift, and received signal strength.

5. The system of claim 4, wherein the ADS-B machine learning analysis includes a signal injection attack neural network machine learning analysis, the signal injection attack neural network machine learning analysis previously trained on a set of ADS-B message injection attack training data.

6. The system of claim 1, wherein the ADS-B machine learning analysis includes a message modification attack neural network machine learning analysis, the message modification attack neural network machine learning analysis previously trained on a set of ADS-B message modification attack training data.

7. The system of claim 1, wherein the determination of the attack probability includes Bayesian inference processing of the ADS-B attack type identification and the ADS-B signal subset.

8. The system of claim 7, wherein the attack probability includes at least one of a probability of detection, a probability of false alarm, and an accuracy.

9. An automatic dependent surveillance-broadcast (ADS-B) cyber-attack detection method comprising:
    receiving an ADS-B data set from an ADS-B signal receiver;
    generating a plurality of ADS-B signal characteristics based on the ADS-B data set;
    generating an ADS-B signal subset based on the plurality of ADS-B signal characteristics and on an ADS-B cyber-attack type, wherein the ADS-B cyber-attack type includes an ADS-B message modification attack and the ADS-B signal subset includes an ADS-B message modification signal subset, the ADS-B message modification attack signal subset including received signal strength, bad packet ratio, rate of climb, rate of turn, speed rate, and displacement rate;
    generating an ADS-B attack type identification based on an ADS-B machine learning analysis of the ADS-B signal subset;

determining an attack probability based on the ADS-B attack type identification and the ADS-B signal subset; and generating an ADS-B attack output based on the determined attack probability and the ADS-B attack type identification.

10. The method of claim 9, wherein the ADS-B jamming attack signal subset includes at least one of a mean eigenvalue, signal-to-noise ratio, received signal strength, bad packet ratio, or energy test statistic.

11. The method of claim 10, wherein the ADS-B machine learning analysis includes a jamming attack random forest machine learning analysis, the jamming attack random forest machine learning analysis previously trained on a set of ADS-B jamming attack training data.

12. The method of claim 9, wherein:
the ADS-B cyber-attack type includes an ADS-B message injection attack; and
the ADS-B signal subset includes an ADS-B injection attack signal subset, the ADS-B injection attack signal subset including ownship latitude, ownship longitude, transmitter latitude, transmitter longitude, velocity difference, doppler shift, and received signal strength.

13. The method of claim 12, wherein the ADS-B machine learning analysis includes a signal injection attack neural network machine learning analysis, the signal injection attack neural network machine learning analysis previously trained on a set of ADS-B message injection attack training data.

14. The method of claim 9, wherein the ADS-B machine learning analysis includes a message modification attack neural network machine learning analysis, the message modification attack neural network machine learning analysis previously trained on a set of ADS-B message modification attack training data.

15. The method of claim 9, wherein the determination of the attack probability includes Bayesian inference processing of the ADS-B attack type identification and the ADS-B signal subset.

16. The method of claim 15, wherein the attack probability includes at least one of a probability of detection, a probability of false alarm, and an accuracy.

17. At least one non-transitory machine-readable storage medium, comprising a plurality of instructions that, responsive to being executed with processor circuitry of a computer-controlled device, cause the computer-controlled device to:

receive an ADS-B data set from an ADS-B signal receiver;

generate a plurality of ADS-B signal characteristics based on the ADS-B data set;

generate an ADS-B signal subset based on the plurality of ADS-B signal characteristics and on an ADS-B cyber-attack type, wherein the ADS-B cyber-attack type includes an ADS-B message modification attack and the ADS-B signal subset includes an ADS-B message modification attack signal subset, the ADS-B message modification attack signal subset including received signal strength, bad packet ratio, rate of climb, rate of turn, speed rate, and displacement rate;

generate an ADS-B attack type identification based on an ADS-B machine learning analysis of the ADS-B signal subset;

determine an attack probability based on the ADS-B attack type identification and the ADS-B signal subset; and generate an ADS-B attack output based on the determined attack probability and the ADS-B attack type identification.

18. The non-transitory machine-readable storage medium of claim 17, wherein the determination of the attack probability includes Bayesian inference processing of the ADS-B attack type identification and the ADS-B signal subset.

* * * * *